United States Patent [19]

Chang

[11] Patent Number: 4,793,190
[45] Date of Patent: Dec. 27, 1988

[54] DEVICE FOR MEASURING AND INDICATING FLOW AROUND A BEND

[76] Inventor: Shih-Chih Chang, 2339 Darison Ave., Richland, Wash. 99352

[21] Appl. No.: 76,880

[22] Filed: Jul. 23, 1987

[51] Int. Cl.$^4$ ............................ G01F 1/06; G01F 1/20
[52] U.S. Cl. ............................... 73/861.33; 73/861.87; 116/274
[58] Field of Search ........... 73/861.32, 861.33, 861.79, 73/861.87, 861.88; 116/274

[56] References Cited

U.S. PATENT DOCUMENTS 1,877,509  9/1932  Hubley .............................. 116/274
2,906,121  9/1959  Knauth .............................. 73/861.88

Primary Examiner—Herbert Goldstein

[57] ABSTRACT

A device for measuring and indicating fluid flow around a flow bend such as an elbow consists of a housing which confines the flow bend and a flow cavity which is connected with the outer side of the curvature of the flow bend. There is a rotor with a number of substantially radial blades which is free to rotate about a fixed axis in the flow cavity. The hydrodynamics of the flow around the bend generates a secondary circulating flow in the cavity which induces a vortex flow therein and the vortex strength increases monotonically with the rate of the bend flow. The rotor, which is substantially co-axial with the vortex, is driven by the vortex to turn in the flow cavity. The rotating speed of the turning rotor is monitored by a sensor which provides the flow rate measurement through a predetermined correlation. For sight flow indication application a view port is provided for visual observation of the rotor which provides a positive indication of fluid flow in the flow band.

11 Claims, 3 Drawing Sheets

DEVICE FOR MEASURING AND INDICATING FLOW AROUND A BEND

BACKGROUND OF INVENTION

This invention relates to a device for measuring and indicating flow around a bend. The present invention consists of a cavity connecting to a curved segment of a flow conducting pipe or conduit and employs the dynamics of the curved flow to generate a secondary flow vortex in the cavity and cause an indicating rotor to rotate therein. The flow through the bend can be visually indicated by the rotational motion of the rotor or the flow rate can be determined by the speed of the rotor as the rotor speed increases monotonically with the flow rate.

Measurement of fluid flow in pipes and conduits is one of the common tasks in industry and in laboratories. There are many measurement methods currently in use for different fluids, flow rate ranges, and accuracy requirements. While they vary in measurement techniques, they all measure the main flow directly. As a consequence most common flow measurement systems interfere with the flow field being measured and cause undesirable effects, in particular, high pressure drop. A common type of flow measuring instrument, turbine flow meters, consists of a rotor with turbine blades which essentially span over the main flow path. The fluid flow is guided through the turbine blades and turns the turbine and the flow rate is deduced by monitoring the rotating speed of the turbine. In this measurement process the main flow interacts with the turbine blades and some of the flow energy is converted to rotational motion and turbulence which subsequently dissipated as heat.

In-line sight flow indicator is another useful flow monitoring device which offers a simple, inexpensive means of identifying flow and direction, as well as the color and clarity of the fluid. Sight flow indicators are used to provide a reliable verification of flow in filter, lubrication, and cooling lines and to provide a positive and reliable backup for meters, switches, process indicators, and other control devices. Since sight flow indicators provide a visualization of flow they are readily interpreted by the observer. A number of different sight flow indicators have been developed to serve specific needs. The rotary sight flow indicator has been found to be the best way to show flow in opaque fluids because of the high visibility of the rotor. The rotary sight flow indicator is also preferred in certain applications because the motion of the rotor is visible from a distance.

Heretofore, rotary sight flow indicators have been designed to be used in a straight pipe section. In order to cause the rotor to turn in the conventional design, a rotary flow indicator is generally constructed with a flow diverting element at the inlet of the indicator to direct flow to one side of the the rotor. The asymmetric flow impingement on the rotor results in an unbalanced torque which causes the rotor to turn such that rotor blades upon which the flow is impinging move in the direction of the flow. This movement of the rotor blades, which can be visually observed through a view port, provides a positive indication of flow in the fluid. In a flow indicator capable of displaying flow in either direction (bi-directional), two such flow diverting elements are required, one at either end of the cavity.

The most undesirable characteristic is the high pressure drop arising from the flow diverting element which partially blocks the flow path and consequently introduces a large resistance to flow by decreasing the flow area at the inlet to the cavity. High pressure drop translates to high energy consumption and high operating costs. In fact, this high pressure drop is the main reason why rotary flow indicators are considered less appropriate than other types of flow indicators in many applications, in spite of the fact that rotary flow indicators provide a better visual flow indication. Another disadvantage of the conventional rotary flow indicators is their insensitivity to low flows. In order to enhance the low flow sensitivity of a conventional rotary sight flow indicator a strong flow deflection is required to induce rotation of the indicating rotor. Increasing the amount of flow deflection is achieved by increasing the flow diverter blockage at the inlet which results in an increased pressure drop at elevated flows. Even with the penalty of increased pressure drop resulting from the enhanced flow diversion, the conventional design still fails to provide the desired flow sensitivity at low flows. The flow deflection required to turn the indicator rotor results in a pressure drop through the indicator which is too high for many applications. In summary, the conventional rotary flow indicators are designed to observe the flow at a straight pipe section they causes far too much flow resistance. Heretofore, no rotary flow indicators have been available which indicate the flow at an elbow and all conventional rotary flow indicators consume significant amounts of flow energy.

The invention as described herein introduces a new approach for flow measurement and for sight flow indication. The working principle is based on inducing and measuring a secondary flow vortex to deduce the flow rate of the main fluid flow. This new approach involves a modification of a curved main flow path by adding a cavity joined to the main flow at the curved section in such a manner that a secondary vortex flow is generated therein. The main flow is measured by quantifying the strength of the vortex induced in the cavity. A great advantage of this new approach is that it causes only minimum interference to the main flow and as a consequence it produces little or no additional pressure drop since it is not interposed in the main flow path. In fact, introducing a properly designed cavity in a flow bend can result in more favorable local flow conditions and the overall pressure drop around the bend can be lower than that with out the cavity. Clearly, such a reduction in pressure drop can not be achieved by existing flow measurement methods.

The reason for the observed reduction has to do with the boundary layer structure in curved flow and the flow separation which occurs in this boundary layer, causing most of the irrecoverable flow losses, or pressure drop, associated with an elbow. The existence of a flow cavity redefines the boundary layer structure which can prevent flow separation which would otherwise occur by replacing the small local flow reversal loops at the wall with a single large flow reversal loop in the cavity. Flow bends, such as elbows, are extremely common in piping systems and the flow meter, in accordance with the present invention, can be installed in place of an ordinary flow bend. It is therefore realistic to expect that simultaneous with a flow measurement, a pressure reduction can be achieved.

The working principle of the present invention, which can be applied equally well to flow measuring devices as to a sight flow indicator, is drastically different from that of common turbine flow meter and rotary flow indicators. These differences can be enumerated as follows:

A. All conventional turbine flow meters and sight flow indicators are design for used in a straight pipe section. The present disclosed invention is specifically for measuring and indicating a flow around a flow bend.

B. In the conventional turbine flow meter or sight flow indicator all of the main flow is forced to pass through the cavity containing the rotor. In accordance with the present invention, the rotor is housed in a cavity that is adjacent to the main flow path and the main flow does not pass through the rotor. The rotor interacts with a secondary flow of the band flow but not the main flow.

C. Conventional turbine meters interact with all of the flow in a configuration in which the flow is basically straight and the rotor must rely on the lift of the blades to produce the rotational force. The flow meter described in accordance with the present invention is designed to measure the strength of a counter-rotating secondary vortex co-axial with the rotor with the rotational force being provided by the vortex flow.

OBJECTS OF THE INVENTION

The main object of the present invention is to provide a device which is to be located at a flow bend and which is capable of acting as either a flow indicator or a flow meter.

Another object of the present invention is to provide a flow indicating device and a flow metering device that introduces little or no additional pressure drop to the flow path, thus energy consumption normally associated with common flow indicators or meters can be saved.

A specific object of the present invention is to take advantage of the hydraulic characteristics of the flow field around a flow bend to provide a flow indicating and a flow metering device by driving an indicating rotor with an induced secondary flow field which provides the sight indication or flow rate measurement.

The advantages of this invention include little or no pressure drop, energy savings, structural simplicity, high sensitivity to low flows and bidirectional flow indication. The objects and advantages of this invention will become obvious from consideration of the drawings and descriptions which follow.

SUMMARY OF THE DISCLOSURE

The flow measuring and indicating device, in accordance with the present invention, consists of a housing which contains a flow bend and a cavity connecting to the outer portion of the flow bend substantially at the point of greatest curvature. The cavity communicates with the flow bend through an opening through a section of the outer wall of the flow bend. The rotor is contained in the cavity and is rotatable about a fixed axis. The rotor has a number of substantially radial blades. For use as a sight flow indicating device the device is provided with at least one view window positioned such that the rotational motion of the rotor can be visually observed through said window. For use as a flow measuring device it is provided with a rotating speed counter and a means for converting rotating speed to flow rate and a means for displaying converted flow rate.

The working principle of the present invention relies on a hydrodynamic phenomenon of the secondary flow field induced in a cavity situated on the outer portion of a flow field which turns around a bend. A fluid flow through an elbow requires an inwardly-directed radial force in order to turn, which is created by a non-uniform pressure field along the main flow path. This inwardly-directed force is required to change the momentum of the flow by changing the flow direction. Along the outer wall of the curvature of the bend the dynamic pressure rises due to the momentum of the flow. By providing a cavity in this high pressure area the pressure field at the bend will induce a secondary flow field in the the cavity as a portion of the main flow enters the cavity in the high pressure region (downstream) and returns to the main flow at the low pressure region (upstream). This large flow reversal loop replaces the small local flow reversal patterns, or eddies, which are normally present in a flow elbow. The circulation in and out of the cavity forms a fluid vortex within the cavity which rotates in the same manner as a wheel in contact with a road. Since the axis of the rotor in the cavity is located near the center of the vortex and the rotor is free to turn, it will be turned by the rotating fluid of the vortex. The strength of this secondary vortex increases monotonically with the main flow rate and, consequently, so does the rotational speed of the rotor. Thus the turning rotor provides a positive flow indication in a sight flow indication device and the rotational speed of the rotor can be converted to flow rate in a flow metering device.

An unique feature of the present invention is that the rotor, which is the only moving component, is not exposed to the main flow but is positioned in a cavity which is attached to the main flow conduit at the flow bend. As a consequence, the rotor does not directly interfere with the main flow. The present invention monitors a secondary effect, namely the secondary vortex flow in the cavity, and provides flow measuring and indicating of the main flow. In construction, design concept, and in working principle, the flow measuring and indicating device in accordance with the present invention is clearly distinguishable from all existing rotary flow meters and flow indicators.

BRIEF DESCRIPTION OF DRAWINGS

Referring to FIG. 1, a preferred embodiment of the present invention comprises a housing 1 which contains a curved flow path with 90° turn 2 and a substantially circular cavity 3 connected with the curved flow path by intersecting its outer section. There is a rotor means 4 with a rotating shaft and a number of substantially radial blades. The shaft is positioned perpendicular to the plane of the curve at, or near, the center of the cavity. There is a view port 5 equipped with two view windows by means of which the fluid inside the housing and the motion of the rotor can be observed.

FIG. 2 depicts the operation of the rotary sight flow indicator, in accordance with the present invention. As flow enters the indicator housing 1 the radial force produced by the pipe wall which induces the curvature of the flow path 2 creates a pressure gradient along the outer side of the turn. This pressure gradient create a secondary flow in the cavity 3 in a manner such that a portion of the curved flow circulates in and out of the cavity 3. This secondary circulating flow impinges on the rotor blades and drives the indicating rotor 4 to turn.

FIG. 3 depicts a preferred rotor assembly design, in accordance with the present invention, which consists of a rotational speed counter 6 having a permanent magnet 8 in a blade and a coil 9 which picks off the rotational speed of the rotor. The flow rate of the main flow system is measured by converting the signal from the rotational speed counter using a predetermined correlation.

Figure 1:
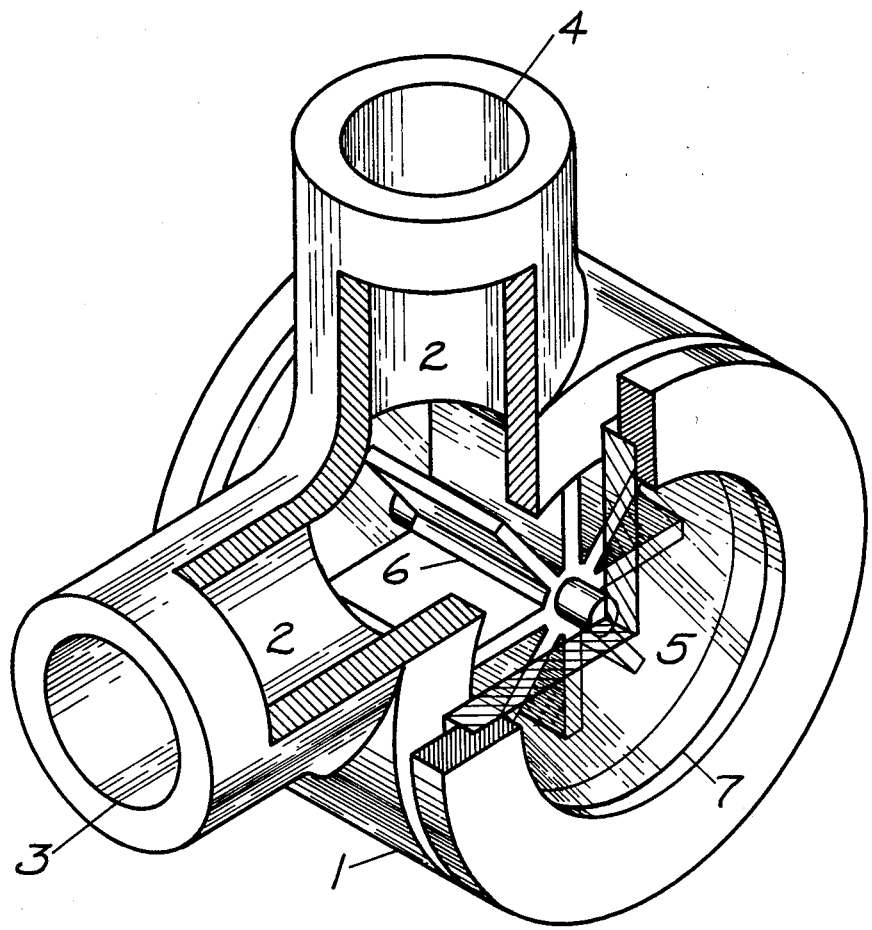
FIG. 1 is a perspective view of a rotary sight flow indicator in accordance with the present invention.
Figure 2:
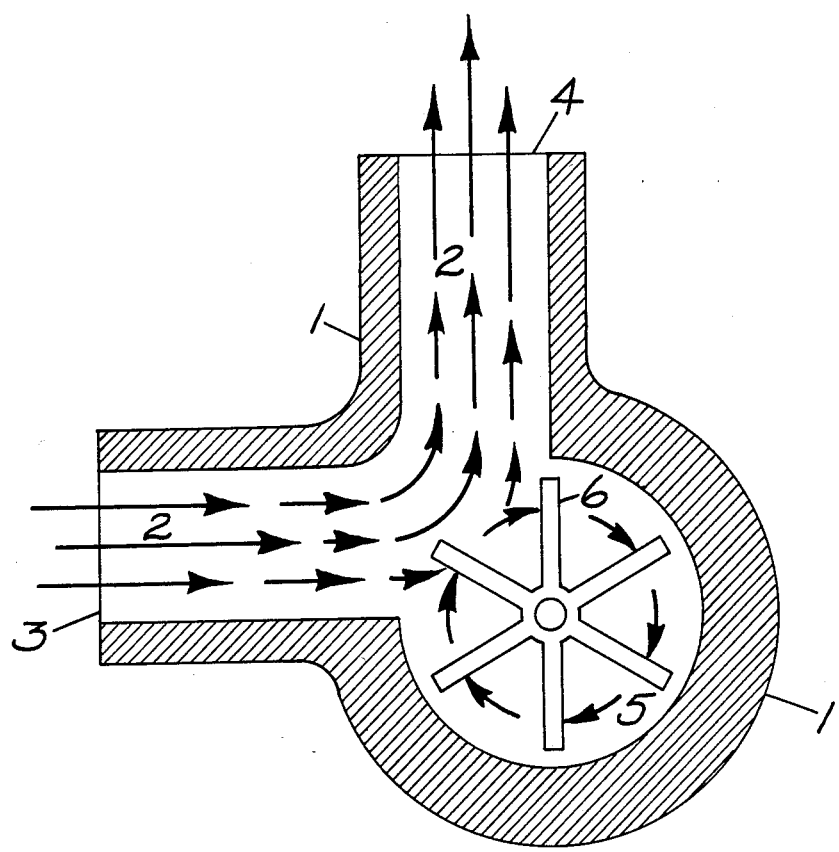
FIG. 2 is a cross-sectional view of a rotary sight flow indicator which shows the normal operational mode, in accordance with the present invention.
Figure 3:
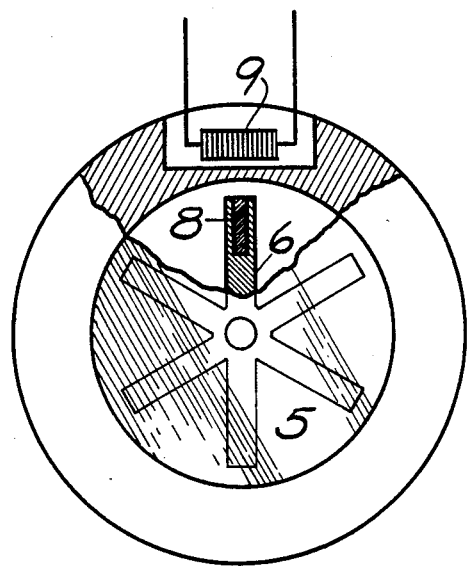
FIG. 3 is a view of an embodiment showing the rotation velocity measuring components.

It is understood that the present specification has disclosed an invention which represents a new concept for rotary sight flow indicators with low flow resistance and high sensitivity to low flows. The embodiment which has been described can be modified in numerous ways without departing from the scope of the present invention as defined in the claims.

I claim:

1. A device for indicating fluid flow by visual observation comprising a housing containing a curved flow path, a cavity positioned at the outer side of the curvature of said curved flow path and connecting to said fluid in said curved flow path, an inlet portion connected to one end of said curved flow path and an outlet port connected to the second end of said curved flow path; a rotor means with a plurality of substantially radial blades being rotatable about a fixed axis in said cavity, at least one view port; the flow field in said curved flow path inducing a secondary flow vortex in said cavity, said vortex flow driving said indicating rotor to rotate; said view port being positioned such that it provides a view of said rotor and, thereby, said fluid flow being detected visually by viewing said turning rotor through said view window.

2. A device as in claim 1 wherein said cavity being a circular cylindrical having an center axis being substantially coincident with said axis of rotor rotation; the boundary of said cavity intersecting and cutting off a section of the outer wall of said curved flow path to form a flow opening so that said cavity communicates with the liquid in said curved flow path through said opening.

3. A device as in claim 1 wherein said curved flow path comprises a right angle turn.

4. A device as in claim 1 wherein the center line of said curved flow path is a circular arc.

5. A device as in claim 1 wherein said cavity is configured and positioned symmetrically with respect to the curved path such that both forward and reverse flows can be indicated equally.

6. A device for measuring flow rate of a fluid flow comprising a housing containing a curved flow path, a cavity positioned at the outer side of the curvature of said curved flow path and connecting to said fluid in said curved flow path, an inlet port connected to one end of said curved flow path and an outlet port connected the second end of said curved flow path; a rotor means with a plurality of substantially radial blades being rotatable about a fixed axis in said cavity, at least one view port; the flow field in said curved flow path inducing a secondary flow vortex in said cavity; said vortex flow driving said rotor to rotate in the manner such that the rotational speed increasing monotonically with the flow rate of said curved flow path; a means for measuring rotating velocity of said rotor; said flow rate of said curved flow path being deduced from the measured rotor velocity by a predetermined correlation.

7. A device as in claim 6 wherein said means for measuring rotating velocity is an magnetic pick-up counter comprising a permanent magnet rotating with said rotor and a stationary coil; said rotating magnet generating an oscillatory electric signal with a frequency proportional to the rotating speed of said rotor, said frequency being then covered to said rotating speed of said rotor.

8. A device as in claim 6 wherein said cavity being a circular cylindrical having an axis being substantially coincident with said axis of rotor rotation; the boundary of said cavity intersecting and cutting off a section of the wall of said curved flow path at the outer side of the turn to form a flow opening so that the liquid in said cavity communicates with the liquid in said curved flow path through said opening.

9. A device as in claim 6 wherein said curved flow path comprises a right angle turn.

10. A device as in claim 6 wherein the center line of said curved flow path is a circular arc.

11. A device as in claim 6 wherein said cavity is configured and positioned symmetrically with respect to the curved path such that both forward and reverse flows can be measured equally.

* * * * *